Patented Mar. 5, 1935

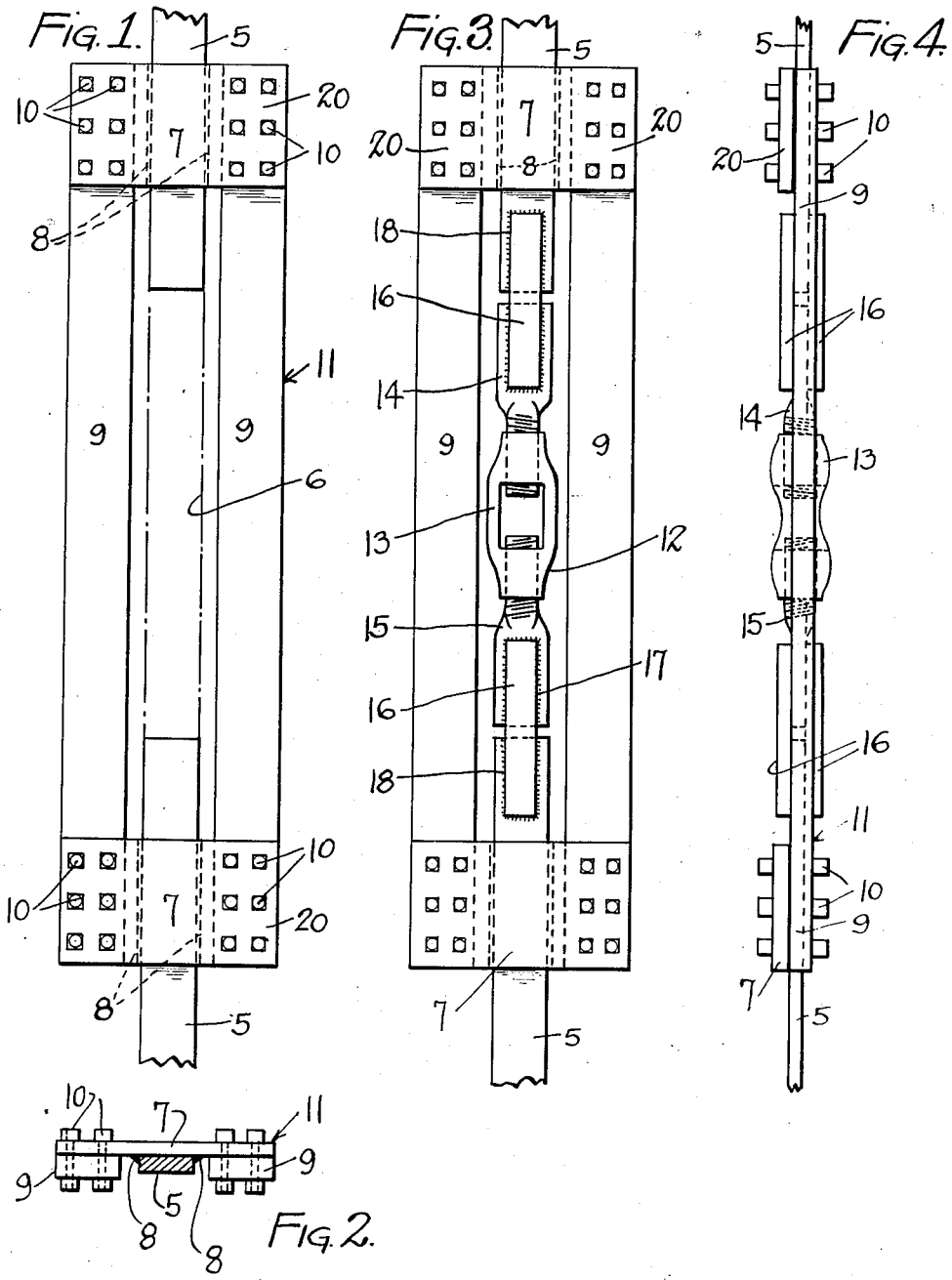

1,992,978

UNITED STATES PATENT OFFICE 1,992,978

TAKING-UP SLACK IN STRUCTURAL MEMBERS

Allen R. Wilson, Lansdowne, Pa., and Robert Seeman, Merrick, and Morris Hallen, Long Island City, N. Y.

Application April 9, 1932, Serial No. 604,292
Renewed December 15, 1934

9 Claims. (Cl. 29—151)

This invention relates to structures and in particular to the taking up of slack in structural members particularly bridge eye bars and the like.

A particular object of our invention is to provide means whereby slack may be taken up in a structural member without disturbing the end connections of the member or otherwise altering the structure.

A further object of our invention is to provide a device which can be placed in the member in which it is desired to take up slack so that it becomes a permanent part thereof and can be adjusted from time to time to take up wear, slack, stretch or other play in the member which might render the structure as a whole, defective.

Changes and variations may be made in the construction shown and described without departing from the principles of the invention or sacrificing its chief advantages; hence such invention is not to be confined to the structures shown in the accompanying drawing, in which, Figure 1 is a plan view showing the first and second steps in our method and illustrating the use of a connecting yoke or frame for holding the ends of the structural member in fixed relation.

Figure 2 is an end view of the structure illustrated in Figure 1 showing how the end plates of the frame or yoke are welded in position on the structural member.

Figure 3 is a view similar to Figure 1 showing the insertion of the turn buckle or screw thread adjusting device positioned between and connected to the ends of the structural member in which slack is to be taken up.

Figure 4 is a view in side elevation of the device as illustrated in Figure 3.

Referring to the drawing in detail, as illustrative of our method of carrying out the objects of our invention, 5 indicates a structural member, in this instance, the eye bar of a bridge structure, in which it is desired to take up slack or play or adjust longitudinally, it being understood that our invention could apply to a member in compression for adjusting the ends thereof, but in the form of invention illustrated, it is desired to draw upon the member 5 to take up the slack as before noted and to this end there is secured at spaced points to the member 5 in its whole condition, as indicated in outline as at 6, the yoke or frame end plates 7 which are secured to the structural member 5 in any suitable manner but as indicated by the welding 8. The plates 7 are connected together by the side bars 9, the ends of the bars 9 being connected to the plate 7 through the medium of the bolt 10 or, if desired, by welding. The first step in our method is the positioning of the frame 11 which includes the end plates 7 and the side bars 9, on the member 5 by welding the end plates 7 thereto, this frame 11 being hereinafter referred to as a yoke frame, a holding device or a connector, the object being to prevent relative movement between the points of connection of the frame with the structural member 5.

The second step in the method after the frame has been welded or otherwise connected to the structural member 5, is the removal of a section from the member 5, as indicated by the outline portion 6, leaving a space in which can be positioned, an adjusting member 12 which consists of the turn buckle 13 and the stub portions 14 and 15, having right and left hand threaded connection with the turn buckle 13 so that the stubs 14 and 15 may have relative adjustment. These stubs 14 and 15 are each connected at their opposite sides by the spliced strips or plates 16 which are welded as at 17 to the stubs 14 and 15 and as at 18 to the ends of the structural member 5 so that the adjusting device is not only positioned in alignment with the structural member 5 but becomes a part thereof.

After the adjusting device has been properly connected in place, as illustrated in Figure 3, and this positioning constitutes the third step in our method, the fourth step of the method takes place, which consists in either removing the side bars 9 by removing the bolt 10 so that the spaced points to which the plates 7 are connected are relatively movable or the entire frame including the plates and the side bars may be removed.

It is more convenient, however, to remove the side bars 9, 10, so that the side bars and the bolts can be used in another job thus cutting down the expense of the operation and then the edges of the plates 7, as indicated by the numeral 20, can be burned off flush with the structural member 5 at the point where the welding took place.

In addition to taking up slack or play in a structural member, our invention contemplates the placing or replacing of a turn buckle or other adjusting member in a solid or non-adjustable structural member without interfering with any of the other parts of the building or bridge structure in which the member 5 may be located. It is to be understood also, that the plates 7 may be bolted or otherwise connected to the structural member 5 although it is preferable not to weaken the member 5 by drilling bolt holes therein.

The method employed therefore consists, first in placing the yoke or frame in position on the structural member 5, then cutting the same out between the ends of the frame as much as desired, then placing in the space between the ends of the member 5, an adjusting member and securing the same at its ends to the ends of the adjusting member and then removing the frame so that adjustment may be made and slack taken up in the structural member 5.

Our invention is not to be restricted to the precise details of construction shown since various changes and modifications may be made therein without departing from the scope of the invention or sacrificing the advantages derived from its use.

What we claim is:—

1. The method of taking up slack in a structural member which consists in connecting a frame to the member at spaced points to prevent relative movement between said points, removing a portion of the member between the connections, securing a screw thread device in the space left by said removed section and between the ends of the member and in alignment therewith, removing said frame and adjusting said device.

2. The method of taking up slack in a structural member which consists in joining spaced points of the member with a connector, removing a section of the member between said points, securing an adjusting device in the space left by said removed section, detaching said connector and actuating said adjusting device.

3. The method of taking up slack in a structural member which consists in securing a frame to the member at spaced points, removing a portion of the member between said points, inserting in said removed portion space, a screw thread device and connecting the ends thereof to the adjacent ends of the member, disconnecting a portion of the frame to permit relative movement between the points, and adjusting said screw thread device.

4. The method of taking up slack in a structural member which consists in securing spaced points of the member in fixed relation, removing a section of the member between the points, substituting for said removed section, a screw thread device, securing said screw thread device in the space left by said removed section releasing said spaced points for relative movement and adjusting said screw thread device.

5. The method of taking up slack in a structural member which consists in securing the frame plates to the member at spaced points, joining said plates with removable connecting bars to hold the points in fixed relation, removing a section of the member between said points, positioning a screw thread device in the space left by said removed section, securing the ends of the device to the adjacent ends of the member, removing the bars of said frame and adjusting said screw thread device.

6. The method of taking up slack in a structural member which consists in securing the frame, including plates and bars, to the member at spaced points, removing a section of the member between said points, positioning a screw thread device in place in said removed section, securing the ends of said device to the adjacent ends of the member, removing parts of the frame to permit relative movement between the points and adjusting said screw thread device.

7. A method of taking up slack in a structural member which consists in joining spaced points of the member with a connector, removing a section of the member between said points, positioning an adjusting device in the space left by said removed section, securing the ends of said adjusting device to the adjacent ends of the member whereby the adjusting device becomes a permanent part of the member, removing said connector and actuating said adjusting device.

8. The method of taking up slack in a structural member which consists in joining spaced points of the member with a connector, including plates welded to said member at said points and bars connecting said plates, removing a section of the member between said points, positioning an adjusting device in the space left by said removed section, securing the ends of said adjusting device to the adjacent ends of the member whereby the adjusting device becomes a permanent part of the member, removing all or part of said connector and actuating said adjusting device.

9. The method of taking up slack in a structural member which consists in joining spaced points of the member with a connector, removing a section of the member between said points, positioning an adjusting device in the space left by said removed section, connecting the ends of the adjusting device to the adjacent ends of the member with splice plates welded to the ends of said device and to the ends of said member, removing said connector and actuating said adjusting device.

ALLEN R. WILSON. [L. S.]
ROBERT SEEMAN. [L. S.]
MORRIS HALLEN. [L. S.]